United States Patent [19]

Wooldridge

[11] 4,044,838

[45] Aug. 30, 1977

[54] AUTOMATIC CONTROL FOR RIPPER TOOL

[75] Inventor: Darrel M. Wooldridge, Oakland, Calif.

[73] Assignee: American Tractor Equipment Corporation, Oakland, Calif.

[21] Appl. No.: 570,034

[22] Filed: Apr. 21, 1975

[51] Int. Cl.² .......................................... A01B 63/111
[52] U.S. Cl. ...................................................... 172/2
[58] Field of Search .................... 172/2, 239, 452, 464, 172/465, 474, 483, 485, 486, 487, 668; 37/DIG. 1

[56] References Cited

U.S. PATENT DOCUMENTS

| | | | |
|---|---|---|---|
| 2,577,351 | 12/1951 | Mott | 172/465 X |
| 2,871,963 | 2/1959 | Harris et al. | 172/465 |
| 2,969,119 | 1/1961 | Barry | 172/2 |
| 2,970,653 | 2/1961 | Hershman | 172/465 |
| 3,042,119 | 7/1962 | Talak | 172/465 X |
| 3,503,456 | 3/1970 | Larson | 172/464 X |
| 3,539,018 | 11/1970 | Sprenkel | 172/484 |

*Primary Examiner*—Paul E. Shapiro

[57] ABSTRACT

A tractor mounted ripper tool employs a programmable control device to change the angular attitude of the ripper blade at a preselected depth.

The control device positions a diverter valve to alternately apply fluid power between a depth positioning power cylinder and a pitch positioning power cylinder such that the attitude of the ripper blade will automatically be changed between a penetrating mode and a ripping mode at a preselected depth. A depth control circuit having a depth sensor switch and a depth selector switch detects the vertical displacement of the ripper tool and provides a command at a preselected depth. A pitch control circuit having a pitch sensor switch and a pitch selector switch detects the angular displacement of the ripper tool and provides a command at a preselected pitch. A control relay is connected to the depth and pitch control circuits and is responsive to the commands thereof to shift the position of the diverter valve and direct fluid power from the depth positioning cylinder to the pitch positioning cylinder when the ripper tool is detected at a preselected depth and alternately shifts the diverter valve to direct fluid power to the depth positioning cylinder when the ripper tool is detected at a preselected pitch. A complementary pair of control circuits repositions the ripper tool when moving in the opposite direction.

17 Claims, 11 Drawing Figures

AUTOMATIC CONTROL FOR RIPPER TOOL

BACKGROUND OF THE INVENTION

Ripper devices are mounted on tractors and are pulled thereby to break a path through the ground and fracture the ground to a certain depth. Such devices are generally in the form of an upstanding shank having a chisel shaped blade at its lower end and attached at its upper end to the tractor through a series of links forming an articulated tool mount. Power cylinders are operatively connected to the tool mount to change the attitude and depth of penetration of the ripper blade. In operation, the ripper blade is elevated to a position out of the ground until the subject ground site is arrived at. At the proper site, the tractor moves forward while the ripper tool is depressed into the ground in a penetrating mode until it reaches the working or ripping depth. Experience has shown that the angle at which the ripper blade is positioned with respect to the path of the tractor affects the efficiency and life of the ripper blade. It has been determined that the ripper blade performs best if it is at a steep angle of attack when moving downward to the ripping depth in the penetrating mode. It has also been determined that the life of the blade is increased if the blade is at a shallow angle of attack when in the ripping or working mode of operation. Thus, it is desirable to change the angle of attack of the ripper blade between the penetrating mode and the ripping mode.

Generally, the depth at which this change is made is derived empirically for a given ground structure. Similarly, the most desirable attitude angles of the ripper blade in the penetrating and ripping modes may change, depending on the particular ground structure.

When a number of tractor operators are engaged in working the same ground plot, it is desirable that they all be working under the same attitude and depth parameters. These parameters are chosen by a supervising operator or "dirt boss". Heretofore, the various operators had to visually rely on the relative position of the ripper shank, tool mount and tractor to determine the depth and attitude of the ripper blade. Obviously, this provided varying degrees of accuracy in reaching and maintaining the prescribed depth and pitch for the ripper blade.

It is in the course of the above that this invention is concerned, wherein the expertise of an experienced supervisor may be used to best position the ripper blade for individual tractors by preselecting settings on an automatic control device and where the preselected conditions will be carried out without the conscious effort of the tractor operator.

SUMMARY OF THE INVENTION

It is a principal object of the present invention to provide an automatic control device which may be programmed to change the angular attitude of a ripper tool at a preselected depth.

Another object is to provide such a control device to change the angular attitude of a ripper tool from one preselected angle to another preselected angle at a preselected depth.

Yet another object is to provide an automatic control device for changing the angular attitude of a ripper tool by utilizing a depth control circuit to initiate change in pitch when the ripper tool is detected at a preselected depth and to utilize a pitch control circuit to terminate the change in pitch when the ripper tool is detected at a preselected pitch.

Still another object is to provide such a control device which includes complementary circuitry to change the pitch to one setting when the ripper tool is descending and to change the pitch to another setting when the ripper tool is ascending such that the ripper tool will be at a steeper inclination when it is above a preselected depth for most efficient penetration and will be at a more shallow inclination below a preselected depth for most efficient ripping.

A further object is to provide a system for controlling the vertical displacement and angular displacement of a ripper tool by mounting the ripper tool on an articulated tool mount and selectively moving the mount with a depth positioning power means and a pitch positioning means. Power is alternately applied to the respective positioning means in response to a control means. The control means includes an automatic component which determines which positioning means is operational and also includes a manual component which determines the direction of power impressed on the positioning means.

Other objects include providing an automatic control device which includes circuits to allow overriding manual operation and also includes circuits to indicate the relative depth of the ripper tool and in which mode it is operating.

DESCRIPTION OF THE PREFERRED EMBODIMENT

Figure 1:
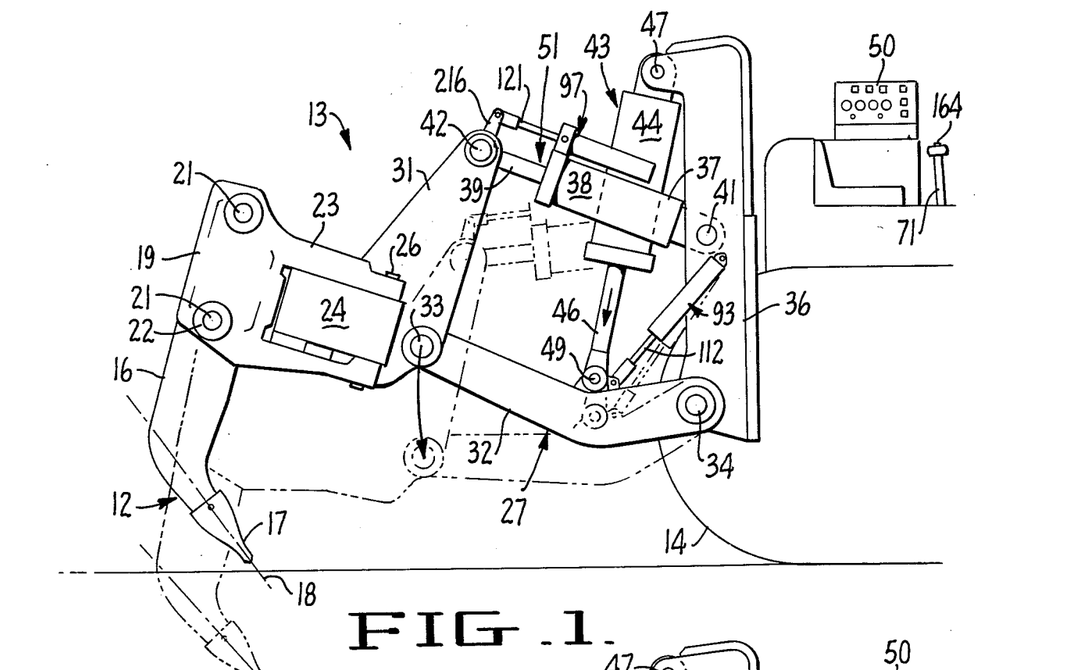
FIG. 1 is a diagrammatic side elevational view of a tractor mounted ripper device utilizing the preferred embodiment of control and illustrating the ripper tool penetrating the ground at a steep angle.
Figure 2:
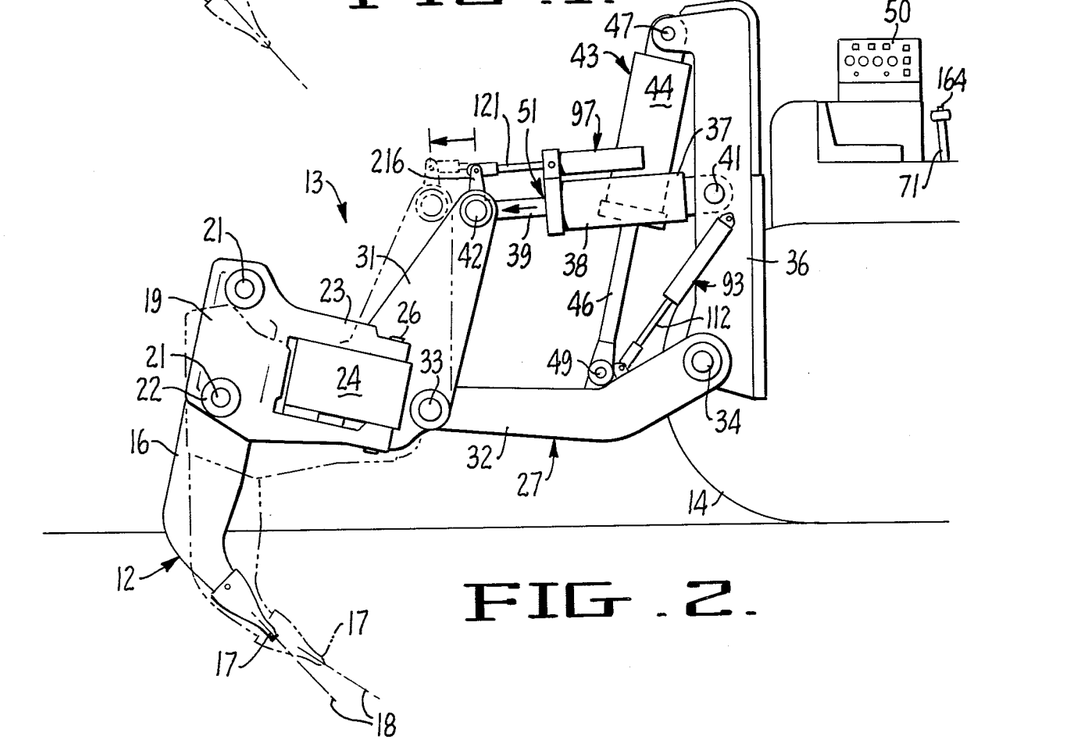
FIG. 2 is a view similar to FIG. 2 illustrating the ripper tool changed to a more shallow angle at a preselected depth.

In FIGS. 1 and 2 there is shown a tractor mounted ripper tool 12 having an articulated tool mount 13 for attachment to the rear of tractor 14. Ripper tool 12 has an upstanding shank 16 terminating at its lower end in a forwardly extending portion on which replaceable ripper blade 17 is affixed. Ripper blade 17 has a chisel shape that tapers toward the leading edge about a horizontal medial plane 18. The angular attitude or pitch of the blade is defined by this plane.

The upper end of shank 16 is connected to shank bracket 19 by pins 21. Shank bracket 19 has a forwardly extending yoke 23 pivotally carried on tool beam 24 so that the ripper may swivel about vertical pin 26 and track the course of the tractor. Tool beam 24 is an elongated horizontal member extending transversely across the rear of the tractor and may support a plurality of ripper shanks thereon.

Articulated tool mount 13 is in the form of a four bar link mechanism 27 combining a series of links to support the tool beam and associated ripper tools for angular and vertical movement relative to the tractor. While the links are in laterally spaced pairs across the rear of the tractor, only one set will be described. Upstanding link 31 is rigidly attached to tool beam 24. Lower trailing link 32 is pivotally attached to the lower end of upstanding link 31 by pin 33 and extends therefrom to pivot pin 34 on the lower end of support bracket 36. Support bracket 36 is vertically positioned and rigidly attached to the rear of tractor 14. Upper link 37 is formed by cylinder 38 and piston rod 39. The inner end of cylinder 38 is pivotally attached to the top of support bracket 36 by pin 41 while the outer end of piston rod 39 is carried by pivot pin 42 at the top of upstanding link 31. Applying fluid power to the alternate ends of the piston of cylinder 38 allows the geometry of the four bar link mechanism to be changed as described hereinafter.

Depth positioning means 43 is operatively connected to tool mount 13 and is formed to raise and lower ripper tool 12. Depth positioning cylinder 44 and piston rod 46 is situated between the laterally spaced pairs of links and extends from the top of rear support bracket 36 to lower trailing link 32. The upper end of cylinder 44 is pivoted on pin 47 and the distal end of piston rod is pivoted on link by pin 49. Fluid power alternately applied to the operative ports at the ends of cylinder 44 will alternately raise the tool mount to an elevated position adjacent rear support bracket 36 and lower the tool mount to a position overlying the surface of the ground where ripper tool 12 will penetrate the ground, as shown in phantom line in FIG. 1.

Similarly, pitch positioning means 51 is formed by cylinder 38. Fluid power alternately applied to the operative ports at the ends of cylinder 38 will alternately swing link 31 about pin 33 and change the pitch of ripper tool 12 as shown in phantom line in FIG. 2.

As mentioned hereinbefore, it is desirable to have the pitch of the ripper blade at a steep angle when penetrating the ground and then to change the pitch angle to a more shallow attitude at a preselected depth for the ripping operation. It is for this change that an automatic control means is provided to selectively apply fluid power to cylinder 44 and cylinder 38 in the proper sequence.

Figure 3:
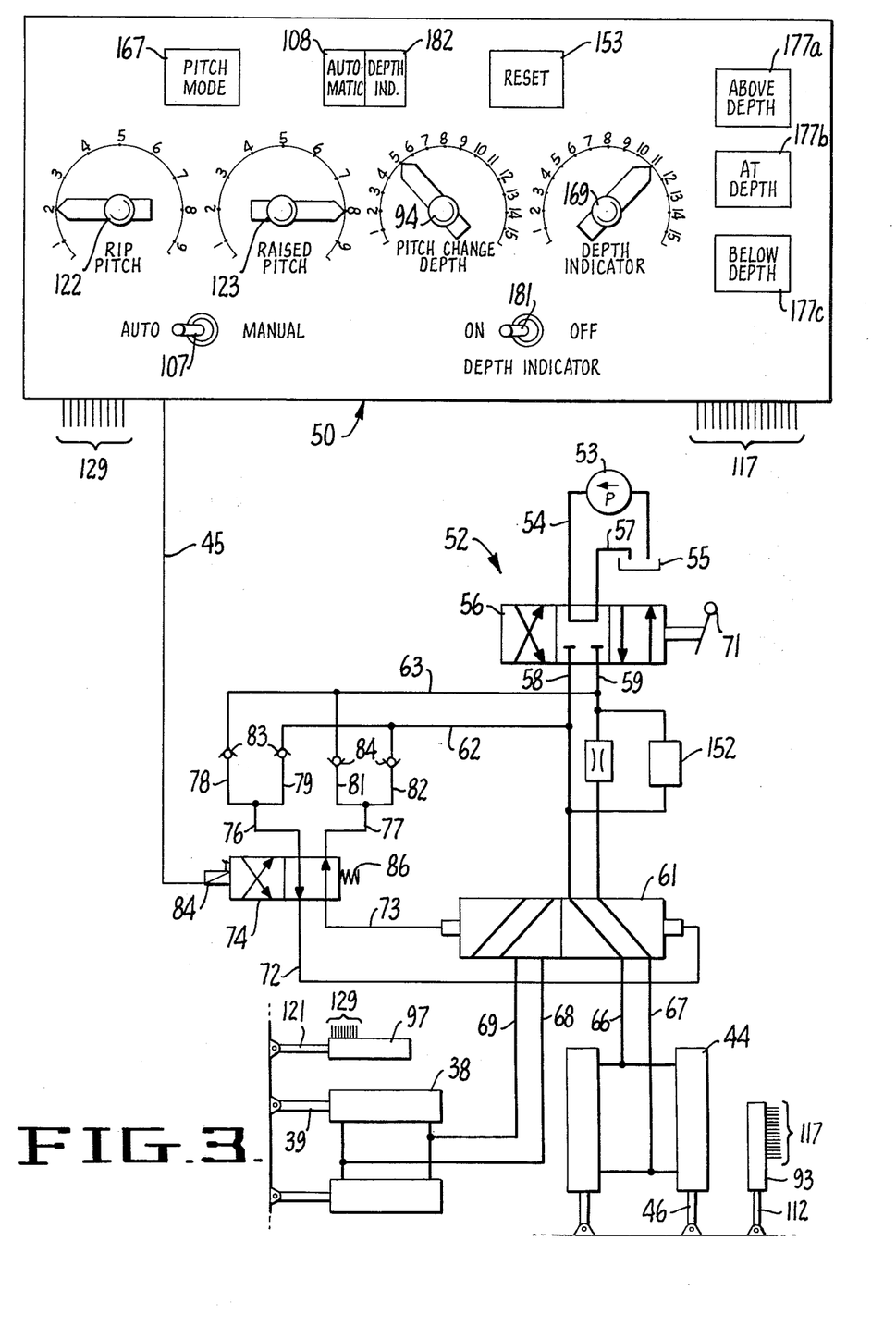
FIG. 3 is a diagrammatic view of the control device of the instant invention illustrating the control panel and fluid power circuit.

As shown in FIG. 3, a fluid circuit 52 is provided which is controlled by output line 45 of an electrical control circuit housed in console 50. Console 50 is housed in the cab of tractor 14 and presents on its face plate, dials and visual display for preselecting settings and indicating conditions under which the control is working.

Fluid circuit 52 includes pump 53 supplying hydraulic fluid under pressure to line 54 from reservoir 55. Pressure line 54 leads to manually operated control valve 56 while drain line 57 leads from valve 56 to reservoir 55. Control valve 56 is a four-way three position valve which can connect pressure and drain lines 54 and 57 to first and second conduit lines 58 and 59 or to close the conduit lines and recycle fluid from pump 53 back to reservoir 55. Conduit lines 58 and 59 are connected to diverter valve 61 and also have branch lines 62 and 63. Diverter valve 61 is well-known in the trade and diverts fluid from conduit lines 58 and 59 to either lines 66 and 67 or lines 68 and 69. Lines 66 and 67 lead respectively to the top and bottom operative ports of depth positioning cylinder 44 while lines 68 and 69 lead respectively to the front and rear operative ports of the pitch positioning cylinder 38. From the foregoing circuit it will be seen that by proper manipulation of manual control valve 56 and diverter valve 61 fluid power from pump 53 may be applied to the depth positioning cylinder 44 to depress or elevate the ripper tool or to apply fluid to the pitch positioning cylinder 38 to flatten or steepen the pitch angle of the ripper blade. Also, it should be noted that manual control valve 56 selects the direction of travel of the cylinder pistons by alternately connecting pressure and drain lines 54 and 57 to conduit lines 58 and 59, while diverter valve 61 selects the cylinder to which conduit lines 58 and 59 are connected and determines which cylinder is operational at any one time.

Manual control valve 56 is shifted by hand stick 71 provided in the cab of the tractor 14. Diverter valve 61 is shifted by fluid pressure from branch lines 62 and 63 and lines 72 and 73 as directed by electrically operated control valve 74. Control valve 74 is a solenoid actuated four-way two position valve having inlet pressure and exhaust lines 76 and 77 connected to branch lines 62 and 63 in tandem through lines 78 and 79 and lines 81 and 82. Lines 78 and 79 have check valves 83 while lines 81 and 82 have check valves 84 positioned in the opposite direction. Thus, line 76 will have pressure and line 77 will be at exhaust irrespective of the condition of conduit lines 58 and 59.

Electrically operated control valve 74 is shifted by solenoid 84 or return spring 86 in response to the presence or absence of an electrical signal from output line 45 of an electrical control means in console 50. The generation of this signal will be described in detail later, but in the instant invention the signal is initiated when the ripper tool is detected at some preselected depth and the signal is terminated when the ripper tool is detected at some preselected pitch. Thus, as the operator directs fluid power through manual valve 56 to conduit line 58 the fluid will first be applied to depth positioning cylinder 44. When the ripper tool is detected at some preselected depth, a control signal is initiated and control valve 74 will change the position of diverter valve 61 to apply fluid to pitch positioning cylinder 38.

Thereafter, when the ripper tool is detected at some preselected pitch, the signal will be terminated and control valve 74 will reposition diverter valve 61 to once again apply fluid power to depth positioning cylinder 44. This sequence will work in both the descending and ascending modes of operation. It will be seen that the only action the operator has to make is to direct fluid to either lower or raise the ripper tool and that the pitch of the tool will automatically be changed at a preselected depth. Thus by preselecting on the console switches the desired raised pitch and rip pitch settings and the depth at which the pitch change will occur, an automatic and reoccurring sequence is performed without the conscious effort of the operator.

Provision is also made in the console for selecting either automatic or manual operation and for indicating whether the ripper blade is above, at, or below some preselected depth.

Figures 4, 4A:
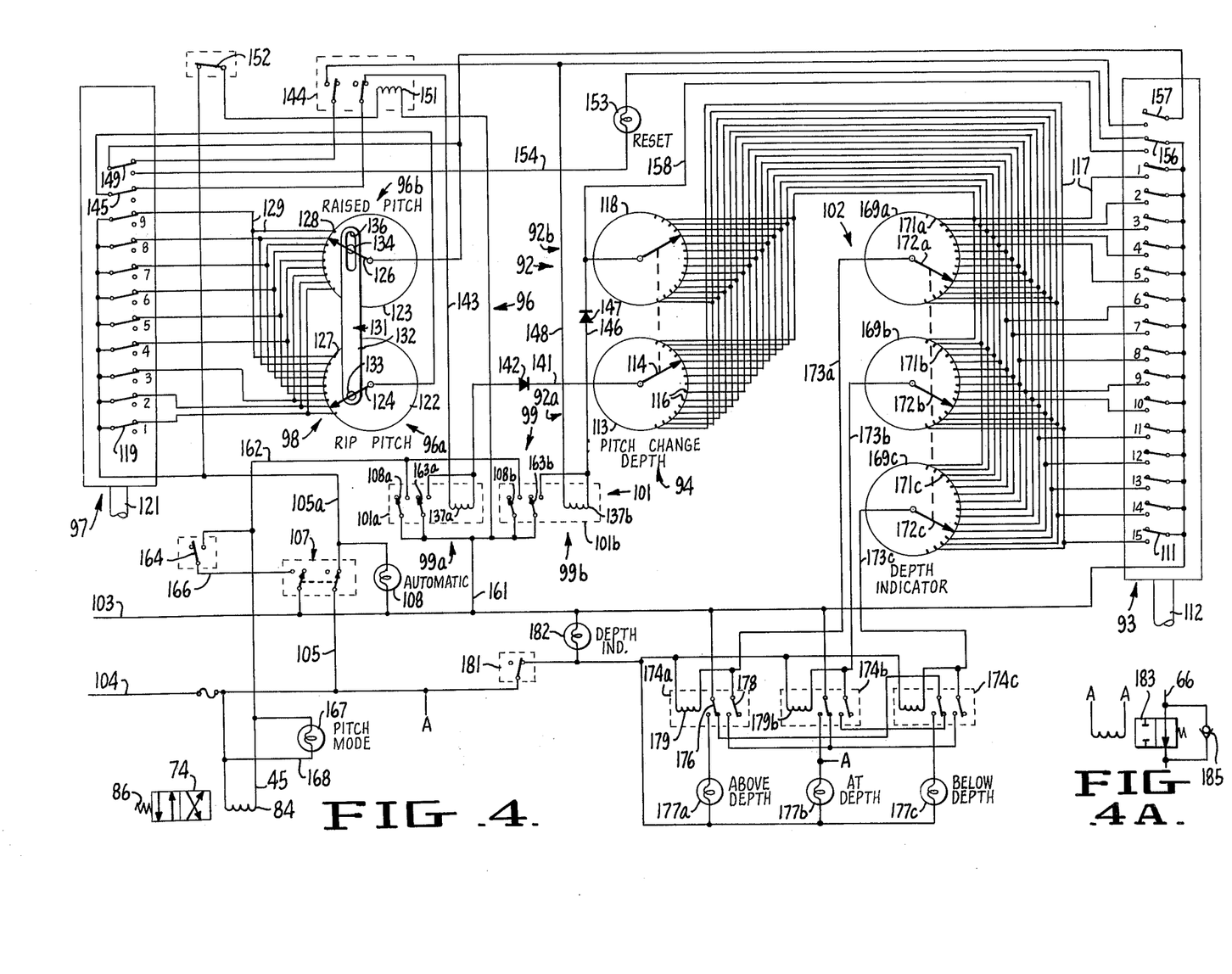
FIGS. 4 and 4A show a schematic view of the electrical circuit of the control device.

FIG. 4 is a schematic diagram of the preferred form of the electrical control circuit used in the present invention for controlling and indicating the position of the ripper tool. Looking at the drawing a few observations may be made. Generally, a depth control circuit 92 having a depth sensor means 93 and a depth selector means 94 are in the upper right of the drawing. A pitch control circuit 96 having a pitch sensor means 97 and a pitch selector means 98 is in the upper left. A control circuit 99 having control means 101 and the solenoid 84 of the electric control valve 74 is in the lower left. A depth indicator circuit 102 is positioned in the lower right. Other controls and indicator lamps are also included as will be noted.

Also, as a general observation, the depth control circuits 92 and pitch control circuit 96 are serially connected with control circuit 99 such that an output will be generated if they are both in a conducting state. Further, the depth control circuit 92 and pitch control circuit 96 each have parallel wired first and second component circuits which are connected to first and second control circuits and provide different circuitry for changing the pitch depending upon whether the ripper tool is descending or ascending.

Specifically, electrical power is supplied to the electrical control means 50 from the tractor electrical system by lines 103 and 104. Line 103 leads to one side of the depth control circuit through depth sensor means 93. Line 104 leads to one side of the pitch control circuit through line 105, automanual selector switch 107 and pitch sensor means 97. Auto-manual selector switch 107 chooses the mode of operation while lamp 108 indicates the automatic mode is operational.

Depth sensor means 93 has a plurality of normally open switch contacts 111, one side of each is connected in common with line 103. Switch contacts 111 are arranged along a line and switch actuating mechanism 112 is movable along the line to sequentially close individual switch contacts in relation to the instantaneous depth position of the ripper tool. The structure for accomplishing this will be discussed hereinafter, but for the schematic showing in FIG. 4, it can be regarded that the switches are stationary and the switch actuator moves up and down with the ripper tool mount.

Depth selector means 94 is a rotary selector switch 113 having a movable switch arm 114 and a plurality of contacts 116 electrically connected by lines 117 to corresponding contacts 111 of depth sensor means 93. A series connection will be made between line 103 and switch arm 114 when switch actuating mechanism 112 closes the corresponding switch contact 111 of sensor 93 to the contact 116 selected on depth selector 94. As mentioned, two depth control circuits are provided. First and second depth selector switches 113 ad 118 are wired in parallel with each other to lines 117 but with the contacts of second depth selector switch 118 connected to the next succeeding corresponding contact of the sensor contacts 111. Since first and second selector switches 113 and 118 have their switch arms ganged together, this wiring method provides an output through first selector switch 113 before second selector switch 118 when senor switches 111 are closed in descending order and conversely provides a prior output through second selector switch 118 when the sensor switches 111 are closed in ascending order. At this time, it should be noted that the depth control circuit 92 initiates a change in pitch and that the pitch control circuit 96 terminates the change in pitch. The necessity of having two depth control circuits will be more apparent when compared with the two component pitch control circuits 96 and the two component control circuits 99.

Pitch control circuit 96 includes pitch sensor means 97 having a plurality of normally closed switch contacts 119 arranged along a line and switch actuating mechanism 121 movable along the line to sequentially open individual switch contacts in relation to the instantaneous pitch position of the ripper tool. Similar to depth sensor 93, it may be regarded that the switches are stationary and the switch actuator 121 moves in and out depending on whether the tool is moving in a steeper or more shallow direction.

First and second pitch selector switches 122 and 123 are rotary switches having movable switch arms 124 and 126 and a plurality of switch contacts 127 and 128 electrically connected in parallel by lines 129 to corresponding contacts 119 of the pitch sensor means 97.

First selector switch 122 selects the angle of the ripping pitch mode and second selector switch 123 selects the angle of the raised or penetrating pitch mode. Interconnecting means 131 defines that the selected pitch on first selector switch 122 will not be steeper than the selected pitch on second selector switch 123. First selector switch arm 124 supports bar 132 on pin 133. Second selector switch arm 126 has pin 134 slidable in slot 136 of bar 132. Looking to the drawing, it will be seen that second arm 126 will never be any increments below first arm 124 as determined by interconnecting means 131.

First pitch control circuit 96a will be conductive when the corresponding switch contacts 119 of the pitch sensor 97 and first pitch selector switch 122 are both closed. Second pitch control circuit 96b will be conductive when the corresponding contacts of pitch sensor 97 and second pitch selector switch 123 are both closed.

First control circuit 99a includes first control means 101a. Second control circuit 99b includes second control means 101b. Each control means is in the form of a relay having an actuating coil 137a and 137b connected in series with their respective depth and pitch control circuits. Each relay further has contacts 108a and 108b for applying current to solenoid 84 of electrically controlled valve 74 in relation to the electrical states of their respective depth and pitch control circuits as impressed on coils 137a and 137b. This in turn positions diverter valve 61 such that if either pair of depth and pitch control circuits are electrically conductive the pitch positioning cylinder will be operational and, if neither pair is conductive, the depth positioning cylinder is operational.

The electrical connection between the first control means 101a and the first depth control and first pitch control circuits includes line 141 from depth selector switch 113 to one side of coil 137a through diode 142. Line 143 leads from the other side of coil 137a to pitch selector switch 122 through a contact of relay 144 and sensor reset switch 145.

The electrical connection between the second control means 101b and the second depth control and second pitch control circuits includes line 146 from depth selector switch 118 to one side of coil 137b through diode 147. Line 148 leads from the other side of coil 137b to pitch selector switch 123 through another contact of relay 144 and sensor reset switch 149.

Diodes 142 and 147 prevent transient signals from acting on relay coils 137a and 137b. Relay 144 has actuating coil 152 responsive to differential pressure switch 152. Differential pressure switch 152 is situated between conduits 58 and 59 in fluid circuit 52 to monitor the differential pressure in the lines. If manual valve 56 is moved to another position, there will be a change in the pressure in conduit lines 58 and 59 and will result in the opening of differential pressure switch 152 and the contacts of relay 144. This ensures that the pitch change operation will be cancelled and diverter valve 61 repositioned to the depth positioning mode if the operator moves valve 56 in the opposite direction during the pitch positioning mode.

Differential pressure switch 152 and its associated relay 144 provide that only one of the control circuits are operational at any one time. For instance, as shown, differential pressure switch 152 is closed to energize relay 144 and complete the circuit through relay coil 137a. This will allow the first control circuit 99a to function depending on the electrical states of the first depth control circuit 92a and first pitch control circuit 96a. If the fluid flow is reversed by moving hand stick 71, differential pressure switch will open and de-energize relay 144 to complete the circuit through relay coil 137b. This will allow second control circuit 99b to function depending on the electrical states of the second depth control circuit 92b and the second pitch control circuit 96b.

Sensor reset switches 145 and 149 are situated at the extreme end of pitch sensor means 97 and are tripped if switch actuator 121 overtravels the selected point of sensor contacts 119 and continues to the extreme upper end point. In such a position, the automatic mode may not be able to be reestablished. In this eventuality, sensor reset switch 145 will open preventing control means 99a from function. Sensor reset switch 149 will also open isolating control means 99b and closing a circuit to reset lamp 153 through line 154 and sensor reset siwtch 156 on depth sensor means 93. If depth switch actuator 112 moves to its extreme end point of the depth sensor 93, switches 156 and 157 will be tripped. Switch 156 will by pass depth selector switch 118 and directly actuate control circuit 99b through line 158. Switch 157 will close and similarly ensure that control circuit 99b is actuated irrespective of the condition of differential pressure switch relay 144 or reset switch 149. This will cause the ripper tool to move to the raised pitch position releasing the pitch positioning cylinder.

Control means 101 receives electrical current from line 103 through line 161. Contacts 108a and 108b, when closed, apply this current through line 162 to solenoid 84 as mentioned. Contacts 163a and 163b hold their associated relay coils 137a and 137b in an energized state through the closed contacts of the pitch control circuit 96. This allows even momentary contact through the depth sensor means 93 to initiate a pitch change cycle.

Manually operated switch 164 is situated on the top of stick 71 and provides for energizing solenoid 84 through "auto-manual" selector switch 107 and line 166. "Pitch mode" indicating lamp 167 will be lighted through line 168 when solenoid 84 is excited.

As an ancillary feature, a depth indicator 102 is included. The output leads of depth sensor 93 are connected in parallel to three rotary selector switches 169a, 169b and 169c. The switches are wired so that switch 169b has contacts 171b wired in common to corresponding contacts 111 of the depth sensor 93 while switch contacts 171a are connected to the next preceding sensor contacts 111 and switch contacts 171c are connected to the next succeeding sensor contacts 111. Switch arms 172a, 172b and 172c are ganged for coincident movement. Each arm is electrically connected to an associated relay through lines 173a, 173b and 173c. Relays 174a, 174b and 174c have contacts 176 which when closed will light lamps 177a, 177b or 177c indicating that the ripper tool is "above depth", "at depth" or "below depth". Furthermore, the relay contacts are wired and interconnected in a network such that once a relay coil is energized, it will close contact 178 and remain in the energized state until another relay is energized. For instance, if a depth sensor contact 111 corresponding to the contact on selector switch 169b is closed, relay coil 179b becomes energized and closes its contacts 176b and 178b. "At depth" lamp 177b is lighted through contact 176b and relay coil 179b remains energized through contact 178b and through the contacts 176c and 176a of its neighboring relays. If depth sensor switch actuator 112 moves onto either the succeeding or preceding sensor contacts 111, one of the neighboring relays will be excited and contact 176a or 176c will release the "at depth" relay 174b. The depth indicator circuit is actuated by switch 181 and is indicated in operation on "depth indicator" lamp 182.

FIG. 4A illustrates a solenoid operated valve 183 which may be included in the depth positioning section of fluid circuit 52 to always maintain the tool above a specified depth. Lines A-A are connected to lines A-A in the control circuit. If the tool is detected at the secified depth, solenoid operated two position two-way normally open valve 183 will be energized and cut off the fluid flow to depth positioning cylinder 44 through line 66. The tool may be raised upon flow reversal through the parallel check valve 185.

Figure 5:
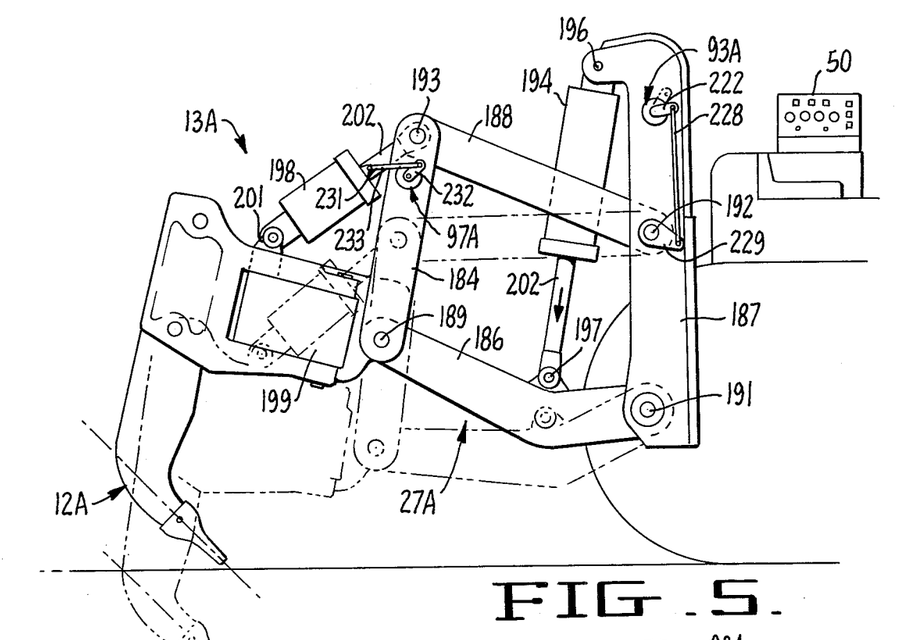
FIG. 5 is an elevational view similar to FIG. 1 and illustrating another embodiment utilizing a different ripper mounting structure.
Figure 6:
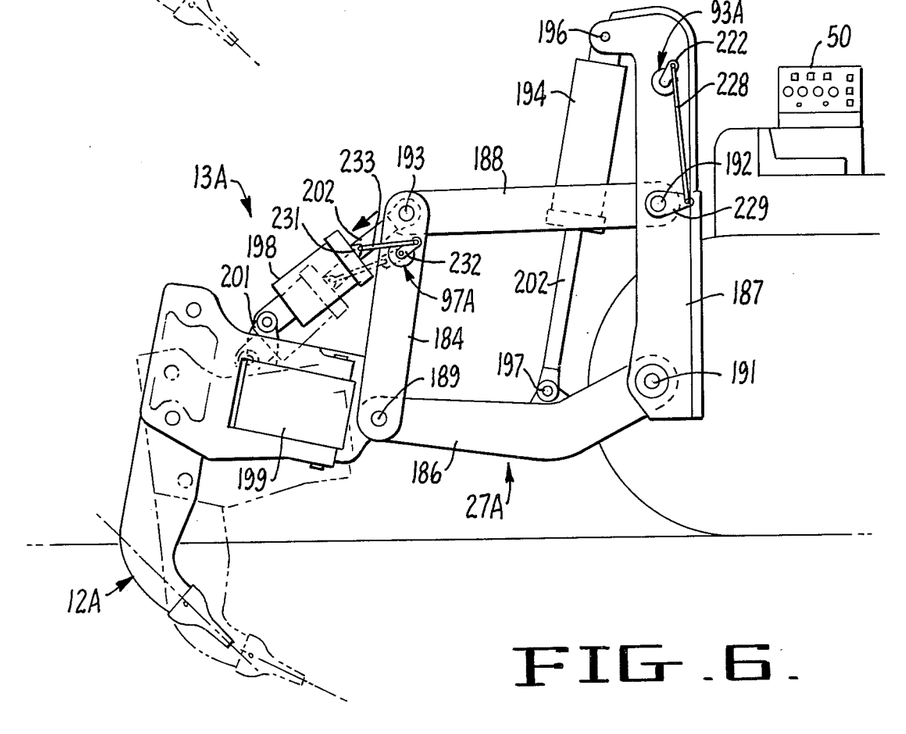
FIG. 6 is a view of the device in FIG. 5 illustrating the change in angular attitude of the ripper tool at a selected depth.

FIGS. 5 and 6 illustrate an alternate embodiment of tool mount 13A. The four bar link mechanism 27A is formed by solid links 184, 186, 187 and 188 pivotally connected at their ends by pins 189, 191, 192 and 193. Depth positioning cylinder 194 is situated as in FIGS. 1 and 2 between pivot pins 196 and 197. Pitch positioning cylinder 198 is pivotally carried on tool beam 199 by clevis 201 and extends diagonally upward therefrom. As fluid power is applied to the operative ports of cylinder 198, piston rod 202 connected to pin 193 will swing tool beam 199 and associated ripper tool 12A about pin 189 and change the pitch attitude of the ripper tool.

Figures 7, 8, 9, 10:
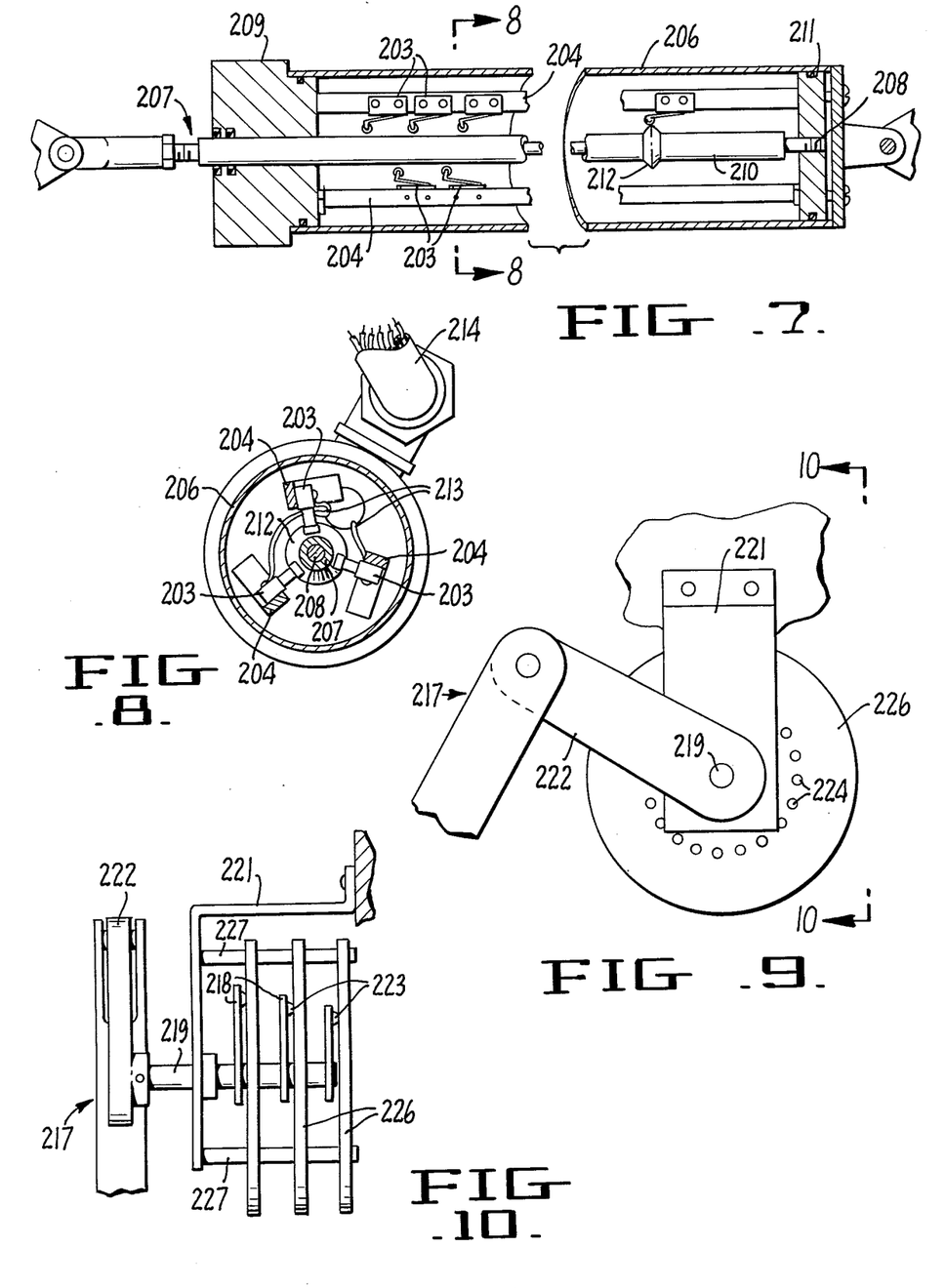
FIG. 7 is a fragmentary sectional view of one of the sensing switch devices employed with the control device of FIGS. 1 and 2.
FIG. 8 is a transverse sectional view taken substantially along the plane of line 8—8 of FIG. 7.
FIG. 9 is a fragmentary view of a rotary sensing switch device as used with the embodiment of FIGS. 5 and 6.
FIG. 10 is a view taken substantially along the plane of line 10—10 of FIG. 9.

FIGS. 7 and 8 illustrate the preferred form of sensor means as used on both depth sensor 93 and pitch sensor 97 in the structure shown in FIGS. 1 and 2. Sensor microswitches 203 are supported on longitudinal bars 204 in cylindrical housing 206. Bars 204 are circumferentially spaced in cylinder 206 and sensor switches 203 are equidistantly spaced along the bars 204. Actuating mechanism 207 is in tubular form supported for axial movement in housing 206 on central support rod 208 through end cap 209. Support rod 208 is threadably connected to end plate 211 at the opposite end of housing 206 from end cap 209. Inner end 210 of actuating mechanism 207 has radially extending trip member 212 which sequentially depresses the switch arms of switches 203 as actuating mechanism 207 is moved in housing 206. Electrical leads 213 from switches 203 are protected in cable 214 between the sensors and console 50.

Looking to FIGS. 1 and 2, depth sensor 93 is connected to support bracket 36 and lower link 32. As depth positioning cylinder 44 moves lower link 32, actuating mechanism 112 will move axially and sequentially actuate sensor switches 111 in relation to the depth position of ripper tool 12 as shown in phantom line in FIG. 1. Pitch sensor 97 is supported on pitch positioning cylinder 38 while its actuating mechanism 121 is operatively connected through clevis 216 on cylinder rod 39. As pitch positioning cylinder 38 moves link 31, actuating mechanism 121 will move axially and sequentially actuate the sensor switches 119 in relation to the pitch position of ripper tool 12 as shown in phantom line in FIG. 2. In some instances it may be desirable to elevate the depth sensor to a position above lower link 32 such as to a position between upstanding link 36 and cylinder 38.

FIGS. 9 and 10 illustrate another form of sensor switch as used on the structure of FIGS. 5 and 6. Actuating mechanism 217 is a series of ganged switch arms 218 carried on shaft 219. Shaft 219 is rotatably journaled in bracket 221 and is pinned to arm 222 at its outer end. Switch arms 218 have contact detents 223 at their outer ends which override circumferentially spaced contacts 224 carried on discs 226. Discs 226 are supported on bracket 221 by spacer lugs 227. As shaft 219 is rotated, switch arms 218 will sequentially contact individual contacts 224 in relation to the angular position of arm 222.

Looking to FIGS. 5 and 6, depth sensor 93A is attached to the upper end of support bracket 187. Arm 222 pivotally carried one end of link 228 while the lower end of link 228 is pivotally carried on arm 229. Arm 229 is secured through pin 192 to move with link 188 of the four bar link mechanism 27A. As depth positioning cylinder 194 moves tool mount 13A, arm 229 will move link 228 and arm 222 a proportional amount. Arm 222 will rotate shaft 219 and attached switch arms 218 to sequentially override individual switch contacts 224 in relation to the depth position of the ripper tool, as shown in phantom line in FIG. 5. Pitch sensor 97A is supported on link 184 and is coupled to the top of pitch positioning cylinder 198 through arm 232, link 233 and arm 231. As pitch positioning cylinder 198 moves tool beam 199, arm 232 will rotate shaft 219 and attached switch arms to sequentially override individual switch contacts in relation to the pitch position of the ripper tool, as shown in phantom line in FIG. 6, In operation, determination is made as to the best penetrating and ripping positions for the ripper tool. This information is programmed into the automatic control means by selecting on the console switches the desired raised pitch and rip pitch and the depth at which the pitch change will occur. A desirable working depth is also selected.

As an example, a desirable rip pitch of "2" is selected on first pitch selector switch 122, a raised pitch of "8" is selected on second pitch selector switch 123 and a pitch change depth of "5" is selected on depth selector means 94. A working depth of "11" is also selected on depth indicator switch 169. Auto-manual switch is put in the automatic position and depth indicator switch 181 is put in the "on" position.

The operator manipulates stick 71 to set manual valve 56 to apply fluid under pressure from pump 53 to conduit line 58 and through diverter valve 61 and line 66 to the top of depth positioning cylinder 44. Piston rod 46 extends and acts through four bar link mechanism 27 to depress ripper tool 12 into the ground. Depth sensor 93 monitors the position of tool mount 13. Actuating mechanism 112 sequentially closes depth sensor contacts 111 in relation to the depth of ripper tool 12. When the depth sensor contact corresponding to "5" is closed, the depth control circuit 92a is rendered conductive and current from line 103 is conducted along line 117 to the selected contact 116 on selector switch 113 and through switch arm 114 and line 141 to one side of relay coil 137a. A conductive path through pitch control circuit 96a to line 104 is provided on the other side of coil 137a through line 143, closed contacts of relay 144, closed switch 145, switch arm 124, line 129, closed pitch sensor contact 119, and line 105a and closed switch contacts of 107.

Relay contacts 108a and 163a close in response to the excited state of coil 137a and conduct current from line 161 to keep the coil excited and also through line 162 to solenoid 84 of electrically controlled valve 74. Electrically controlled valve 74 shifts to apply fluid pressure from line 76 to line 73. This fluid pressure shifts diverter valve 61 to connect lines 58 and 59 with lines 69 and 68. Fluid power is now directed to pitch positioning cylinder 38 and extends piston rod 39 to act through tool mount 13 to change the pitch of ripper tool 12 to a more shallow angle. Pitch sensor 97 monitors the position of tool mount 13. Actuating mechanism 121 sequentially opens pitch sensor contacts 119 in relation to the pitch of ripper tool 12. When the pitch sensor contact corresponding to "2" is opened, the pitch control circuit is rendered non-conductive and relay coil 137a is deenergized. Control means contacts 108a and 163a open and remove electrical current from line 161, solenoid 84 and coil 137a. Electrical control valve 74 shifts under pressure from spring 86 and directs fluid pressure through line 72 to reposition diverter valve 61. Diverter valve once again connects conduit lines 58 and 59 with lines 66 and 67 and makes depth positioning cylinder 44 operational.

The operator may continue to depress the ripper tool which is now positioned for a ripping mode of operation. Depth sensor means 93 will continue to monitor the depth of the ripper tool and will indicate to the operator through depth indicator means 102 the relative depth position of the ripper tool. The operator may raise and lower the ripper tool as necessary for best ripping operation and the ripper tool will remain at the ripping pitch as long as the tool does not move above the selected pitch change depth.

After the ripping operation is completed, the operator elevates the ripper tool by shifting manual control valve to connect pressure line 54 with line 67 at the lower port of depth positioning cylinder 44. This elevates tool mount 13. Depth sensor 93 continues to monitor the position of tool mount 13 by sequentially closing depth sensor contacts 111. When the sensor contact, corresponding to the contact selected on depth sensor switch 118, is reached, control means 101b is actuated. This in turn energizes solenoid 84 to shift control valve 74 and positions diverter valve 61 in the pitch change mode. Pitch positioning cylinder 38 is supplied with fluid power and piston rod 39 moves tool mount 13 to put the ripper tool at a steeper angle. Pitch sensor 97 monitors the position of tool mount 13 by sequentially opening pitch sensor contacts 119. When the sensor contact, corresponding to the selected contact of raised pitch selector switch 123, is opened, pitch control circuit is rendered non-conductive and control means 101b is de-energized. This allows electrical control valve to be shifted by spring 86 and subsequently allows diverter valve to be repositioned in the depth positioning mode.

Thus, if there is an electrical signal from either control means during either the descending or ascending modes, a pitch change will be made. If the operator should change the position of manual valve 56 during this pitch change, differential pressure switch 152 will open or close and cancel the pitch change command by reverting to other mode.

From the foregoing, it will be seen that an automatic control device for ripper tools is provided which will change the pitch of the ripper tool at a preselected depth and allows for positioning the tool for most efficient operation.

I claim:

1. In a tractor mounted tool having a power operated tool positioning mount, a control device therefor comprising,
    a. a depth control circuit including depth sensor means formed for detecting the vertical displacement of the tool,
    b. depth selector means connected in the depth control circuit with said depth sensor means, and
    c. control means connected in said circuit with said depth sensor means and said depth selector means and formed to initiate a change in pitch of said tool when said tool is detected at a preselected depth.

2. A device as defined in claim 1 and including a pitch control circuit, a pitch sensor means connected in the pitch control circuit and formed for detecting the angular displacement of the tool, pitch selector means connected in the pitch control circuit with said pitch sensor means, said control means connected in said circuit with said pitch sensor means and said pitch selector means and formed to terminate any change in pitch of said tool when said tool is detected at a preselected pitch.

3. A device as defined in claim 2 and including depth positioning means operatively connected to said tool and formed for changing the vertical displacement thereof in response to said control means, pitch positioning means operatively connected to said tool and formed for changing the angular displacement thereof in response to said control means, said control means serially connected in said depth control circuit and said pitch control circuit and formed to alternately actuate and deactuate the said depth and pitch positioning means such that only one positioning means is operational at any one time.

4. A device as defined in claim 3 and wherein said depth sensor means is in the form of a plurality of switch contacts arranged along a line and includes a switch actuating mechanism which is formed to move along the line and sequentially actuate the individual switch contacts in relation to the instantaneous depth position of the tool, and said depth selector means is in the form of a selector switch having a movable switch arm and a plurality of contacts electrically connected to corresponding contacts of the depth sensor means wherein the depth control circuit will be electrically in one state when the switch closing mechanism of the depth sensor means actuates the corresponding switch contacts to those selected on the depth selector means, said pitch sensor means is in the form of a plurality of switch contacts arrayed along a line and includes a switch actuating mechanism which is formed to move along the line and sequentially actuate the individual switch contacts in relation to the instantaneous pitch position of the tool, and said pitch selector means is in the form of a selector switch having a movable switch arm and a plurality of contacts electrically connected to corresponding contacts of the pitch sensor means wherein the pitch control circuit will be electrically in the opposite state from the depth control circuit when the switch actuating mechanism of the pitch sensor means actuates the corresponding switch contacts to those selected on the pitch selector means, said control means is in the form of a relay having an actuating coil serially connected in said depth control circuit and said pitch control circuit wherein said coil will be electrically excited when said depth and pitch control circuits are both in an electrically conducting state and will be electrically unexcited when said control circuits are in an electrically non-conducting state, said relay having switch contacts responsive to said coil and formed for alternately controlling the actuation of the depth and pitch positioning means in relation to the electrical states of the depth control circuit and pitch control circuit.

5. The device as defined in claim 4 and wherein, said depth positioning means includes a fluid power operated cylinder and said pitch positioning means includes a fluid power operated cylinder, a fluid circuit including a first fluid conduit and a second fluid conduit connected to control said cylinders and having a source of fluid pressure, a fluid control valve formed for selectively applying fluid under pressure to either said first fluid conduit or said second fluid conduit, a diverter valve formed for selectively connecting the first and second conduits to the operative ports of either the depth positioning cylinder or the pitch positioning cylinder, said diverter valve positioned in response to the condition of said control means wherein actuation of said relay will connect said first and second conduits to one of the power operated cylinders and deactuation of the relay will connect the conduits to the other power cylinder.

6. The device as described in claim 5 and having a sequence of operation wherein, said diverter valve is initially positioned to connect the first and second conduits to the depth positioning cylinder and said fluid control valve directs fluid pressure to extend the said cylinder and depress said tool in a penetrating mode, and wherein when the tool is detected at a preselected depth said control means is actuated to position the diverter valve so that the first and second conduits are connected to the pitch positioning cylinder to extend the said cylinder in a pitch change mode, and wherein when the tool is detected at a preselected pitch the control means repositions the diverter valve to reconnect the conduits with the depth positioning cylinder to extend said cylinder in a working mode such that an automatic sequence is accomplished of depressing a tool to a preselected depth, changing the pitch of the tool at that depth to a preselected working pitch and then further depressing the tool such that there is an automatic change in pitch from the penetrating mode to the working mode.

7. The device as defined in claim 5 and wherein branch lines are connected with said first and second conduits, said diverter valve is positioned by fluid pressure from said branch lines, an electrically operated control valve is operatively connected in said branch lines to control the direction of fluid pressure for positioning the diverter valve, said electrically operated control valve is electrically connected to the contacts of said relay and is responsive to the electrical condition thereof such that said electrically operated control valve will position the diverter valve in response to the electrical condition of the depth control circuit and the pitch control circuit as impressed on the relay coil.

8. The device as defined in claim 7 and including manually operated switch mmeans formed for overriding the depth control circuit and pitch control circuit wherein said electrically controlled valve may be actuated on a non-automatic command.

9. In a tractor mounted ripper tool having a power operated tool positioning mount, a control device therefor comprising,
    a. first and second depth control circuits, each having separate but dependent depth selector means,
    b. a depth sensor means formed for detecting the vertical displacement of the ripper tool,
    c. first and second pitch control circuits, each having separate pitch selector means,
    d. a pitch sensor means formed for detecting the angular displacement of the ripper tool,
    e. a first control means serially connected with said first depth control circuit and with said first pitch control circuit,
    f. a second control means serially connected with said second depth control circuit and with said second pitch control circuit,
    g. said first and second control means formed for controlling the power operated positioning tool mount wherein said first control circuit will be operational when said tool mount is descending such to change the pitch of the ripper tool to a first preselected pitch at a first preselected depth and said second control means will be operational when said tool mount is ascending such to change the pitch of the ripper tool to a second preselected pitch at a second preselected depth.

10. A device as defined in claim 9 and including, a depth positioning power means operatively connected to said ripper tool, a pitch positioning power means operatively connected to said ripper tool, and wherein said first and second control means alternately apply power to the depth positioning power means and the pitch positioning power means.

11. A device as defined in claim 10 and wherein, the pitch selector means of the first pitch control circuit and the pitch control circuit and the pitch selector means of the second control circuit each define respectively a ripping pitch mode and a penetrating pitch mode and includes interconnecting means which define that the selected penetrating pitch mode will put the ripper tool in a steeper inclination than the ripping pitch mode.

12. The device as defined in claim 10 wherein said control means are responsive to the conductive state of respective depth control circuits, said depth sensor means connected in said depth control circuits and formed for detecting the vertical displacement of the ripper tool and having a depth selector means wherein said depth control circuits will be in a conductive state when the ripper tool is detected at a preselected depth.

13. The device as defined in claim 12 and including a depth indicating means for indicating the relative vertical displacement of the ripper tool, said indicating means having an above depth indicating circuit, an at depth indicating circuit and a below depth indicating circuit, each of said indicating circuits including a selector switch which denotes presettable settings corresponding to depth settings of the ripper tool, said depth sensor means connected with said indicating means wherein individual indicating circuits will be activated in relation to the detected position of the ripper tool, each circuit further having visual indicating means denoting which circuit is activated.

14. The device as defined in claim 13 and wherein said selector switches have a plurality of switch contacts electrically connected to corresponding switch contacts of the sensor means and a movable switch arm serially connected with an activating relay coil, relay contacts responsive to the relay coil and connected in an interconnected network with the relay coils of the other indicating circuits such that the activated coil will remain energized until another relay coil is energized through the sensor means and selector switch, said relay further having contacts connected to visual indicating lamps for indicating which circuit is energized.

15. A device as defined in claim 9 and wherein, said first and second depth control circuits are parallel connected electrical circuits and said first and second pitch control circuits are parallel connected electrical circuits, said first depth control circuit and first pitch control circuit define a first control circuit for said first control means and said second depth control circuit and second pitch control circuit define a second control circuit for said second control means, each of said depth selector means is in the form of a selector switch having a movable switch arm and a plurality of contacts which denote preselectable settings corresponding to depth settings of the ripper tool, said depth sensor means is in the form of a plurality of normally open switch contacts arrayed along a line and electrically connected to corresponding contacts of each of the first and second depth selector means in parallel, and said depth sensor means further having a movable switch actuating mechanism which is formed to move along the line and sequentially close the individual switch contacts in relation to the instantaneous depth position of the ripper tool, each of said pitch selector means is in the form of a selector switch having a movable switch arm and a plurality of contacts which denote presettable settings corresponding to pitch settings of the ripper tool, said pitch sensor means is in the form of a plurality of normally closed switch contacts arrayed along a line and electrically connected to corresponding contacts of each of the first and second pitch selector means in parallel, and said pitch sensor means further having a movable switch actuating mechanism which is formed to move along the line and sequentially open the individual switch contacts in relation to the instantaneous pitch position of the ripper tool, each of said control means is in the form of a relay having an actuating coil serially connected to the related depth control circuit and pitch control circuit wherein said coil will be electrically excited when the corresponding contacts of the depth selector switch and depth sensor switch and the corresponding contacts of the pitch selector switch and the pitch sensor switch are all in an electrically conducting state and will be electrically unexcited when any of said switch contacts are in an electrically nonconducting state, each of said relays of the related control means having switch contacts responsive to said coil and formed for alternately controlling the actuation of the depth and pitch positioning means in relation to the electrical states of the related depth control circuit and pitch control circuit, said switch contacts of said first control circuit positioned relative to the switch contacts of said second control circuit wherein as the ripper tool descends an electrically conductive state will be acquired by the first control circuit to initiate a change in the pitch of the ripper tool to a shallower mode of inclination, said switch contacts of said second control circuit positioned relative to the switch contacts of said second control circuit wherein as the ripper tool ascends an electrically conductive state will be acquired by the second control circuit to initiate a change in the pitch of the ripper tool to a steeper mode of inclination.

16. A tractor mounted ripper tool having,
 a. an articulated tool mount for supporting and positioning the ripper tool relative to the tractor,
 b. a depth positioning fluid operated cylinder operatively connected to said tool mount and formed for changing the vertical displacement of the ripper tool,
 c. a pitch positioning fluid operated cylinder operatively connected to said tool mount and formed for changing the angular displacement of the ripper tool,
 d. a fluid power circuit for selectively applying fluid power to the said fluid positioning cylinders and having,
  i. a source of fluid power,
  ii. first and second fluid conduits and a fluid control valve formed for selectively directing fluid power to either said first fluid conduit or said second fluid conduit,
  iii. a diverter valve formed for selectively communicating the first and second conduits to the operative ports of either the depth positioning cylinder or the ports of the pitch positioning cylinder, and
 e. control means connected with said diverter valve for positioning said diverter valve and including depth sensor means responsive to the vertical displacement of the ripper tool, said control means operative in response to said depth sensor means to position the diverter valve to direct fluid to the pitch positioning cylinder at a specified vertical displacement.

17. The device as defined in claim 16 and including a pitch control circuit having a pitch sensor means connected with said control means and formed for detecting the angular displacement of the ripper tool, and wherein said control means is responsive, to the angular displacement of the ripper tool as detected by said pitch sensor means wherein the control means repositions the diverter valve to direct fluid to the depth positioning cylinder when a specified angular displacement is attained.

* * * * *